United States Patent [19]

Tattersall

[11] 4,303,034
[45] Dec. 1, 1981

[54] VEHICLES FOR OPERATING OVER WATER

[75] Inventor: Edward G. Tattersall, Southampton, England

[73] Assignee: Vosper Hovermarine Ltd., England

[21] Appl. No.: 158,099

[22] Filed: Jun. 10, 1980

Related U.S. Application Data

[63] Continuation-in-part of Ser. No. 902,186, May 2, 1978, abandoned.

[30] Foreign Application Priority Data

Jul. 8, 1977 [GB] United Kingdom ............... 28658/77

[51] Int. Cl.³ ............................................... B63B 1/34
[52] U.S. Cl. ..................................... 114/67 A; 114/282
[58] Field of Search ................... 180/117–130; 244/100 A; 114/67 A, 282, 292, 274, 280, 123, 126, 150, 151, 56, 61, 283

[56] References Cited

U.S. PATENT DOCUMENTS

| | | | |
|---|---|---|---|
| 3,398,716 | 8/1968 | Neilson | 114/61 X |
| 3,420,330 | 1/1969 | Bliss | 180/128 |
| 3,511,204 | 5/1970 | Tattersall | 114/67 A X |
| 3,559,608 | 2/1971 | Tattersall | 114/67 A |
| 3,572,461 | 3/1971 | Bertin | 114/67 A |

*Primary Examiner*—Douglas C. Butler
*Attorney, Agent, or Firm*—Steele, Gould & Fried

[57] ABSTRACT

A sidewall gas-cushion vehicle is provided with movable buoyancy members, each comprising a buoyant portion of relatively large volume and a web support portion of relatively little volume. The buoyancy members are pivotally connected to the bottoms of the sidewalls by way of their web support portions to the sidewalls, the members being movable about axes extending substantially parallel to the longitudinal axis of the vehicle. In fully submerged operative positions extending below the sidewalls for low speed operation, sufficient hydrostatic forces are applied to the fully submerged buoyant portions of the members to provide buoyancy lift for the vehicle and to counter unwanted movements of the vehicle. In inoperative positions retracted alongside the sidewalls for high speed operation the buoyant portions lie substantially above the operational waterline.

7 Claims, 10 Drawing Figures

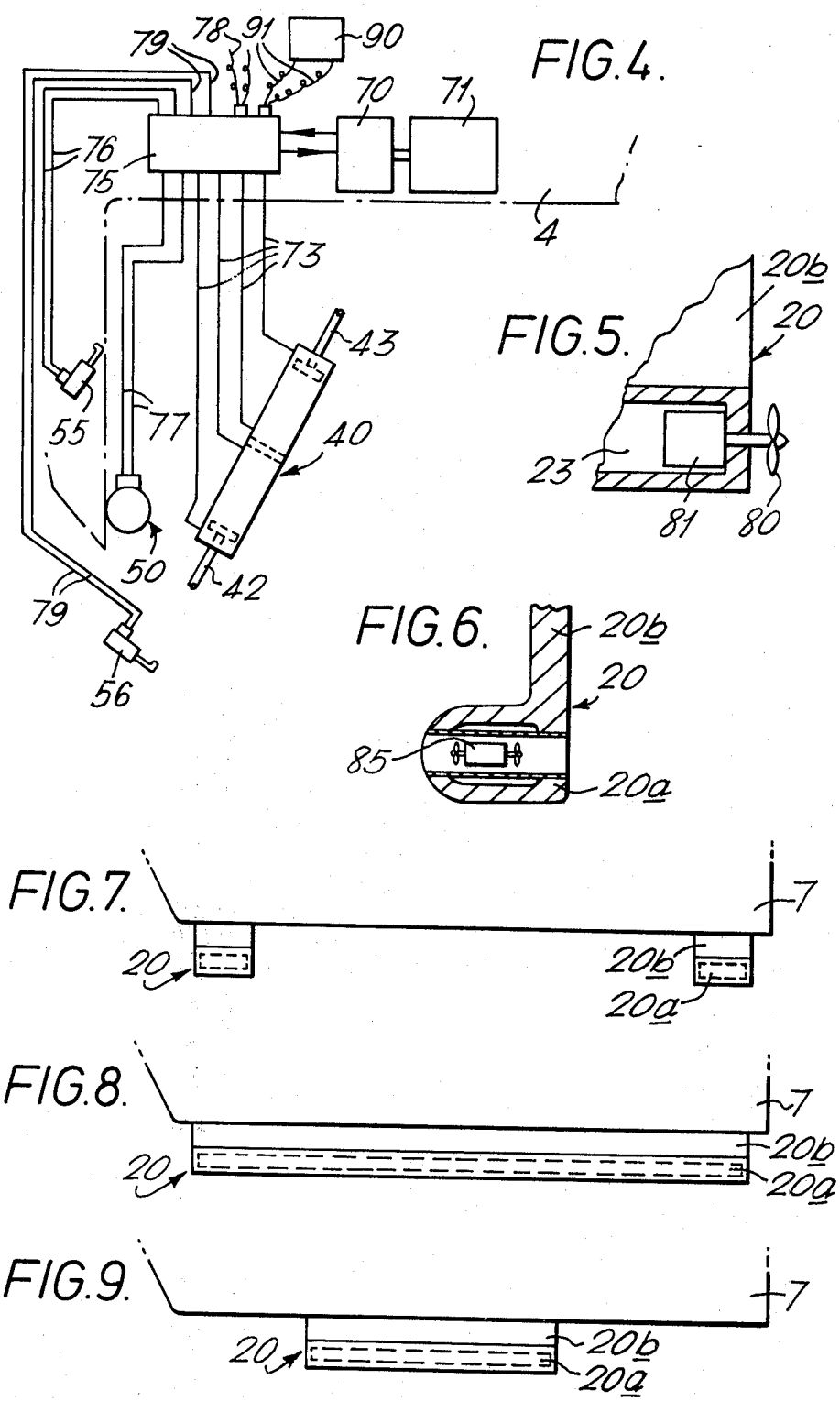

VEHICLES FOR OPERATING OVER WATER

BACKGROUND OF THE INVENTION

This is a continuation-in-part of application Ser. No. 902,186, filed May 2, 1978, now abandoned.

This invention relates to sidewall gas-cushion vehicles. That is to say, to vehicles for operating over a water surface wherein, in operation, a vehicle is supported above that surface, at least in part, by a cushion of pressurized gas, for example, air, formed and contained between the vehicle body and the surface, and wherein the sides of the vehicle-supporting cushion are contained by a pair of laterally-spaced (side) wall structures extending longitudinally along the sides of the vehicle body in substantially parallel array and depending therefrom so as to dip into the water and form a cushion-gas seal.

The ends of the vehicle-supporting cushion may be contained, at least in part, by flexible wall structures or skirts attached to and depending from the vehicle body.

SUMMARY OF THE INVENTION

According to the invention, a sidewall gas-cushion vehicle is provided with buoyancy members capable of being extended into a submerged operative position, whereby hydrodynamic forces are applied to the vessel, or of being retracted into an inoperative position.

The buoyancy members, which are preferably pivotable about axes substantially parallel to the longitudinal axis of the vessel, may be used to counter unwanted movements of the vehicle, such as heave, roll and pitching motions.

The invention can provide a dual-purpose anti-submarine vessel, which in one mode operates as a high-speed sidewall gas-cushion vehicle, and in another mode operates as a low-speed vessel.

BRIEF DESCRIPTION OF THE DRAWINGS

An embodiment of the invention will now be described, by way of example only, with reference to the accompanying drawings, wherein:

FIG. 4 is a semi-diagrammatic illustration of hydraulic supply and control means, and FIGS. 5 to 10 are fragmentary views which illustrate modifications.

In the figures, like reference numerals refer to like components.

DETAILED DESCRIPTION OF THE PREFERRED EMBODIMENT

Figure 1:
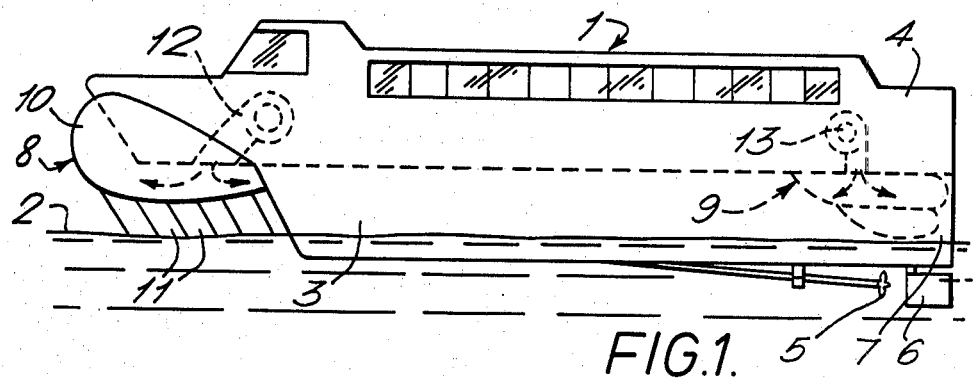
FIG. 1 is a side view of a known form of sidewall gas-cushion vehicle.

Referring first to FIG. 1, a sidewall gas-cushion vehicle 1 (of the form disclosed by U.K. Patent Specification No. 1,448,390), is shown operating over the surface 2 of water, supported thereover by a cushion 3 of pressurized gas (air) formed and contained between the vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a water-screw propeller 5 and a rudder 6.

The front or bow end of the cushion 3 is contained by a flexible skirt 8 and the rear or stern end thereof by a flexible skirt 9. The skirts 8, 9, which are of hollow, inflatable form, and constructed from rubberised fabric, extend laterally between (and in the case of the skirt 8, beyond as well) the front and rear ends of the sidewalls 7. The skirts 8, 9 are attached to the vehicle body 4 and depend therefrom. Flexible skirt 8 is in light contact with the water surface 2. The flexible skirt 9 is maintained clear of the surface 2.

The front flexible skirt 8 is of two-stage form and comprises an inflated bag 10 from which depend a succession of independently-deflectable flexible wall or skirt members 11 of the form disclosed by British Patent Specification No. 1,043,351. (U.S. Pat. No. 3,420,330 of Bliss corresponds). Air forming the vehicle-supporting cushion 3 is provided by a pair of centrifugal fans 12 disposed side by side. Air from the fans 12 passes through the flexible skirt 8 to inflate it before entering the space occupied by the cushion 3. The rear flexible skirt 9 is inflated by air supplied by a centrifugal fan 13.

Figure 2:
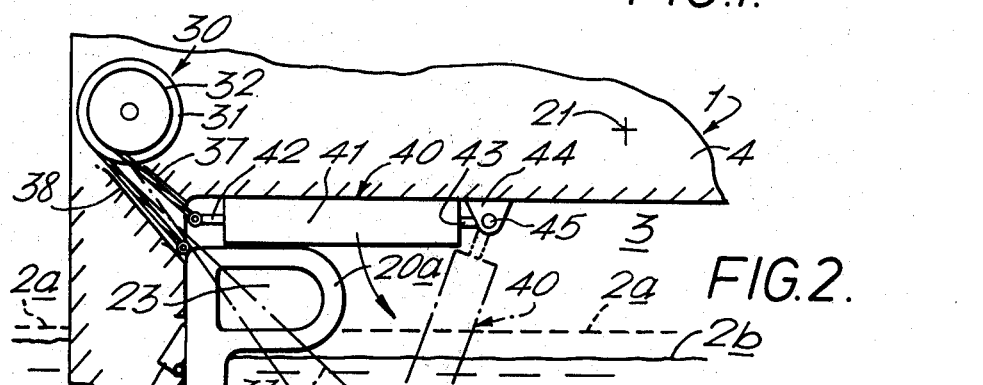
FIGS. 2 and 3 are enlarged bow-end views, in medial section, of part of one of the sidewalls thereof, modified according to the invention.
Figure 3:
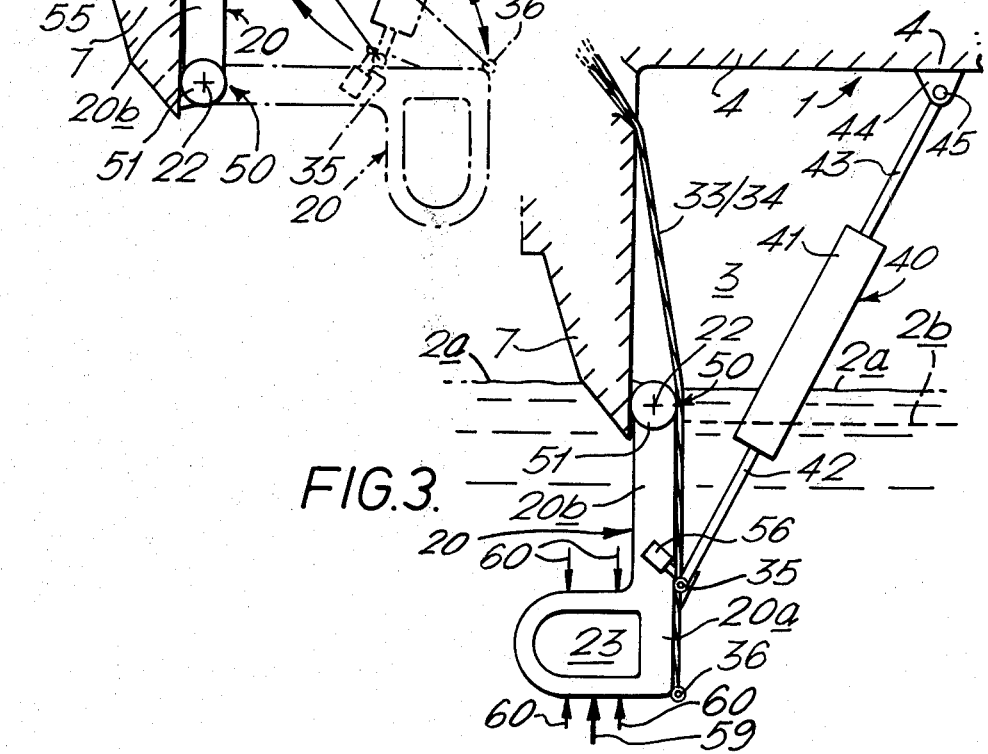

With reference now to FIGS. 2 and 3, the vehicle is modified in accordance with the invention, by providing a pair of buoyancy members 20, each carried by a sidewall 7. Each buoyancy member 20 is capable of being extended, in unison, and as described hereafter, into an operable position (as shown in FIG. 3), whereby its buoyant portion 20a is wholly submerged, or of being retracted inwardly into an inoperative position (as shown in FIG. 2).

The buoyancy members 20 extend lengthwise along the sidewalls 7 and are mounted symmetrically, relative to the longitudinal centre line 21 of the vehicle 1. Each buoyancy member 20 is pivotally attached to the bottom of the associated sidewall 7 so as to be pivotable about an axis 22 disposed substantially parallel to the longitudinal axis 21. When retracted, into the cushion space of the vehicle 1, (as shown in FIG. 2), a buoyancy member 20 lies snugly beside the adjacent inner surface of the associated sidewall 7.

Each buoyancy member 20 comprises a bulbous (buoyant) portion 20a of relatively large volume and a web-like support portion 20b of relatively small volume whereby the support portion 20b is of small water plane area compared with that of buoyant portion 20a.

The interior at least of the buoyant portion 20a of each member 20 may be used for storage etc. purposes. For example, to store fuel and/or to house SONAR equipment. With reference to FIGS. 2 and 3, interior (longitudinally-extending) spaces 23 are provided for this purpose.

The means for extending each buoyancy member 20 into a wholly submerged position comprise electrical winch means 30, fluid actuator means 40 and fluid motor means 50.

Each winch means 30 comprises reversible winch drums 31, 32 driven by an electrical motor (not shown), through independent clutches, (also not shown). Flexible cables 33, 34 wound round the drums are connected to spaced-apart anchorage points 35, 36 on the support portion 20b of the buoyancy member 20. The cables 33, 34 extend through guide channels 37, 38 formed in the vehicle body 4.

Each fluid actuator means 40 comprise a double-ended piston/cylinder type hydraulic actuator 41 with piston rods 42, 43. One end of piston rod 43 is pivotally connected to the vehicle body 4 by a bracket 44, so as to be rotatable about an axis 45 substantially parallel to axes 21, 22. When the fluid actuator means 40 are inoperative, the actuator 41 rests on the upper surface of the associated buoyant portion 20a, as shown in FIG. 2.

Each fluid motor means 50 comprises a hydraulic motor 51 housed in the end of the support portion 20b remote from buoyant portion 20a of member 20 and operable to rotate member 20 about axis 22.

With reference to FIG. 4, fluid power for each actuator means 40 and motor means 50 is provided by a hydraulic pump/driving motor unit 70/71 housed in the vehicle body 4. Fluid inlet/outlet hoses 73, 77 of flexible form are also provided which connect a controller 75 with the working parts of actuator means 40 and motor means 50.

Locking devices 55 are provided to secure the retracted buoyancy members 20 to the sidewalls 7. Similar locking devices 56 are provided to secure one end of each piston rod 42 to its associated buoyancy member 20. (See also FIG. 3). Flexible lines 76, 79 connect locking devices 55, 56 with controller 75. The locking devices 55, 56, winch means 30, actuator means 40 and fluid motor means 50 are all operable, (via controller 75), by remote controls, housed in the vehicle body 4. The remote controls are represented in FIG. 4 by electrical signal lines 78.

In operation, when the vehicle 1 is travelling over the water 2 "on-cushion" and at high speed, (say 50 knots), the buoyancy members 20 are maintained in the retracted, inoperative position, as shown in FIG. 2, when any contact between the water and the increased water plane area resulting from the presence of the buoyant portions 20a alongside the sidewalls 7 is acceptable.

Under these "on-cushion" conditions, the level of the water within the space occupied by the vehicle-supporting cushion 3, i.e. between the sidewalls 7, is substantially as shown by reference 2b.

For anti-submarine or other low speed work, the buoyancy members 20 are extended, as shown in FIG. 3. In this mode, the wholly-submerged buoyant portions 20a of the members 20 cause vertically-acting hydrostatic forces to be applied, as indicated by arrow 59, to the vehicle 1, which forces provide buoyancy lift. In addition, and as indicated by arrows 60, hydrodynamic forces are generated which tend to damp undue vertical movements caused by waves passing "through" the vehicle. As only small water plane areas (bottoms of sidewalls 7, plus upper ends of web support portions 20b of buoyancy members 20), are presented to the water, it will be appreciated that there can only be relatively little response, by way of vehicle movement, to these waves. (Relative, that is, to the substantially larger response which would result from the presentation of a greatly increased water plane area to the waves, as would happen, for example, if the buoyant portions 20a were 50% submerged.

To extend the buoyancy members 20 into their operative positions, locking devices 55 are released and the winch means 30 operated so as to lower the members into the substantially horizontal attitudes shown in dotted lines. (FIG. 2).

As the members 20 rotate about axes 22, the actuators 41 "follow" them down, by rotating about axes 45, until, as shown in FIG. 2, the lower ends of piston rods 42 automatically engage with the support portions 20b of members 20, by way of locking devices 56.

Thereafter, the fluid actuator means 40 and fluid motor means 50 are used to further rotate the members 20 about their axes 22, until substantially vertical, as shown in FIG. 3. To retract the members 20, the above operations are reversed.

It may be possible to dispense with one of the means 40, 50, if the other proves sufficient to rotate the members 20 from a horizontal to a vertical position and vice versa.

As shown in FIG. 5, the vehicle 1 may be provided with additional propulsive power by fitting water-screw propulsion units 80 to the buoyant portions 20a, using prime movers 81 mounted in the spaces 23 thereof. With reference to FIG. 6, manoeuvrability may also be improved by installing reversible water thrust units 85 of the "bow-thrust" type in the portions 20a, whereby lateral thrust forces are generated. In fact, instead of water screw propulsion, combined lateral/-propulsive thrust units may be fitted in the portions 20a. Any of these units may make use of hydraulic motors.

When the buoyant portions 20a of the members 20 are fully immersed, as shown in FIG. 3, they may be made movable relative to the vehicle, whereby unwanted motions can be countered, for example, roll and pitch forces. With reference to FIG. 4, this may be done by use of control means 90 sensitive to the unwanted motions, which employ devices such as gyroscopes and accelerometers to operate actuators 40 via controller 75 and electrical signal lines 91. Thus the immersed buoyant portions 20a can be moved, either singly or in combination, so as to counter said unwanted motions.

As shown in FIG. 7, in order to counter unwanted pitch motions, buoyancy members 20 may be disposed at forward and rearward regions of the sidewalls 7. Anti-pitch movement of wholly-submerged portions 20a of the members 20 will then be operated by control means 90.

When the members 20 are extended into their operative positions, with the portions 20a wholly submerged, the supply of cushion air can either be terminated, or alternatively, continued. When continued, escape of cushion air is prevented by lowering the flexible skirts 8, 9 downwardly, so as to preserve a cushion seal. (Lowering of the skirts may be achieved by adopting the teachings of British Patent Specification No. 1,072,731 of Hovercraft Development Limited).

FIG. 3 illustrates the vehicle 1 "off-cushion", i.e. in a displacement mode with the water at level 2a. When "on-cushion", and with the buoyant portions 20a of the members 20 still fully submerged, the level of the water between the sidewalls 7 will be depressed to substantially that indicated, (in dotted lines), by reference 2b.

The vehicle 1 may also be employed in a displacement mode with members 20 retracted. With reference to FIG. 2, the water level is then substantially as indicted, (in dotted lines) by reference 2a. Large water plane areas are then presented by the sidewalls 7 and buoyant portions 20a of the members 20.

Buoyancy members 20 can extend wholly (FIG. 8) or partially (FIG. 9) along the length of the sidewalls 7.

The teachings of the invention may be advantageously applied to the form of "deep-cushion" gas-cushion vehicle disclosed by our British Pat. No. 1,184,062. (U.S. Pat. No. 3,559,608 of Tattersall corresponds).

The buoyancy members 20 may be of inflatable construction whereby they may be deflated for ease of stowage when retracted.

Alternatively, the buoyancy members 20 may be made floodable, using the spaces 23 and motorized flood valves, for example, so as to effect trim and to assist extension of the members. Motor-driven pumps are then provided for pumping out the spaces 23.

Motors 50 may be used as well as, or instead of, winch means 30 when lowering (or raising) buoyancy members 20 into (or out of) a substantially horizontal position.

Figure 10:
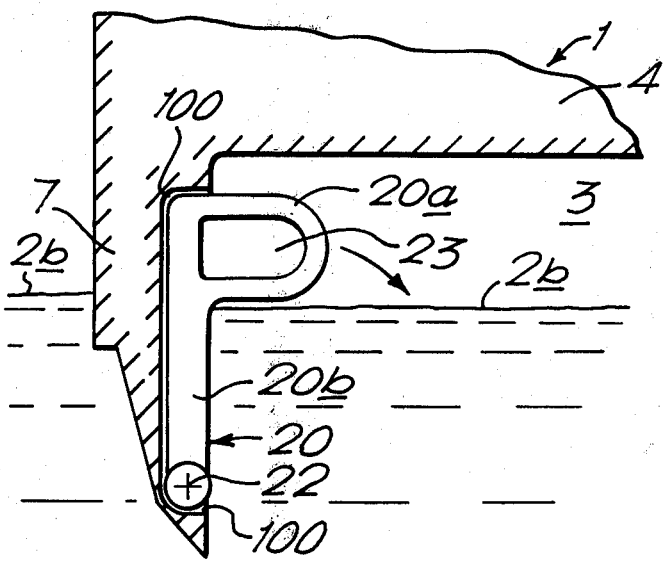

With reference to FIG. 10, in the modification illustrated thereby, which has parts removed for reasons of clarity, buoyancy members 20 which extend only partially along the sidewalls 7 are used. (As in FIG. 9). The pivot axes 22 are disposed within the sidewalls 7 so that when the members 20 are in the retracted or inoperative positions shown by FIG. 10, the web support portions 20b of the members 20 are located within the sidewalls, with the sides of the portions 20b substantially flush therewith. Thus only the buoyant portions 20a of the members 20 extend beyond the sidewalls whereby, compared with the arrangement illustrated by FIG. 2, the combined water plane areas presented by the sidewalls and retracted members 20 are substantially reduced.

To allow unhindered movement of the buoyancy members 20 between inoperative and operative positions, appropriate portions of the sidewalls 7 are cut away to form recesses 100.

The modification of FIG. 10 may be combined with the arrangement illustrated by FIG. 7 whereby "fore and aft" buoyancy members 20 are used.

I claim:

1. A sidewall gas-cushion marine vehicle, comprising:
    a vehicle body having laterally spaced sidewalls extending longitudinally along the sides of the vehicle body and depending therefrom, the sidewalls having bottoms which, in use, extend into the water;
    movable buoyancy members, each comprising a buoyant portion capable of displacing a relatively large volume of water and a web support portion capable of displacing only a relatively little volume of water, each of the buoyant portions defining relatively wide surfaces extending laterally from the web portions, said surfaces being substantially horizontal in fully submerged operative positions;
    means pivotally connecting said web support portions adjacent the bottoms of the sidewalls of said vehicle, the buoyancy members being movable about axes extending substantially parallel to the longitudinal axis of the vehicle;
    means for lowering the buoyant portions of the members into said fully submerged operative positions extending below the sidewalls for low speed operation, whereby sufficient hydrostatic forces are applied to the fully submerged buoyant portions of the buoyancy members during said low speed operation to provide buoyancy lift for the vehicle and to counter unwanted movements of the vehicle; and,
    means for raising said buoyancy members into inoperative retracted positions alongside the sidewalls for high speed operation, whereby the buoyant portions are ineffective.

2. A sidewall gas-cushion vehicle as claimed in claim 1, wherein the buoyancy members carry additional vessel propulsion means.

3. A sidewall gas-cushion vehicle as claimed in claim 1, wherein the buoyancy members carry water thrust means.

4. A sidewall gas-cushion vehicle as claimed in claim 1, wherein the buoyancy members extend partially along the length of the sidewalls.

5. A sidewall gas-cushion vehicle as claimed in claim 1, wherein the buoyancy members are disposed partially at forward and rearward regions of the sidewalls.

6. A sidewall gas-cushion vehicle as claimed in claim 1, wherein the sidewalls comprise recesses and the web support portions of the buoyancy members are retractable into the recesses.

7. A sidewall gas-cushion marine vehicle, comprising:
    a vehicle body having laterally spaced sidewalls extending longitudinally along the sides of the vehicle body and depending therefrom, the sidewalls having bottoms which, in use, extend into the water;
    movable buoyancy members, each comprising a buoyant portion of relatively large water plane area and a web support portion of relatively little water plane area each of the water plane areas of the buoyant portions including a relatively wide surface extending laterally from the web support portion, the surfaces being substantially horizontal in fully submerged operative positions;
    means pivotally connecting said web support portions adjacent the bottoms of said sidewalls, the buoyancy members being movable about axes extending substantially parallel to the longitudinal axis of the vehicle;
    means for lowering the buoyant portions of the members into fully submerged operative positions extending below the sidewalls for low speed operation, whereby sufficient hydrostatic forces are applied to the fully submerged buoyant portions of the members during said low speed operation to provide buoyancy lift for the vehicle and to counter unwanted movements of the vehicle; and,
    means for raising said buoyancy members into retracted inoperative positions alongside the sidewalls for high speed operation, whereby the buoyant portions are ineffective.

* * * * *